United States Patent
Gotesdyner et al.

(10) Patent No.: US 7,660,889 B2
(45) Date of Patent: Feb. 9, 2010

(54) INITIALIZATION AND ACQUISITION OF PEERS IN A PEERS' LIST IN A PEER-TO-PEER NETWORK

(75) Inventors: Rony Gotesdyner, Sunnyvale, CA (US); Ravid Sagy, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 845 days.

(21) Appl. No.: 10/951,727

(22) Filed: Sep. 29, 2004

(65) Prior Publication Data

US 2005/0105476 A1 May 19, 2005

Related U.S. Application Data

(60) Provisional application No. 60/520,648, filed on Nov. 18, 2003.

(51) Int. Cl.
*G06F 15/173* (2006.01)
(52) U.S. Cl. .............. 709/224; 709/216; 709/217; 709/223; 709/227; 370/254; 370/392; 370/469
(58) Field of Classification Search ............ 709/216, 709/217, 223, 224, 227
See application file for complete search history.

(56) References Cited

U.S. PATENT DOCUMENTS

| | | | |
|---|---|---|---|
| 6,269,099 B1 | 7/2001 | Borella et al. | |
| 6,463,471 B1 | 10/2002 | Dreke et al. | |
| 6,728,232 B2 | 4/2004 | Hasty et al. | |
| 2002/0042693 A1 | 4/2002 | Kampe et al. | |
| 2002/0107935 A1* | 8/2002 | Lowery et al. | 709/216 |
| 2002/0143918 A1 | 10/2002 | Soles et al. | |
| 2002/0147771 A1 | 10/2002 | Traversat et al. | |
| 2002/0184357 A1 | 12/2002 | Traversat et al. | |
| 2002/0188657 A1 | 12/2002 | Traversat et al. | |
| 2003/0041141 A1 | 2/2003 | Abdelaziz et al. | |
| 2003/0093562 A1 | 5/2003 | Padala | |
| 2003/0152034 A1 | 8/2003 | Zhang et al. | |
| 2003/0217140 A1* | 11/2003 | Burbeck et al. | 709/224 |
| 2006/0007911 A1* | 1/2006 | Hankins et al. | 370/351 |

OTHER PUBLICATIONS

U.S. Appl. No. 60/520,648, dated Nov. 18, 2003, entitled: "Initialization and Acquisition of Peers in a Peers' List in a Peer-To-Peer Network".
Clay Shirky, What is P2P . . . And What Isn't? Nov. 24, 2000.

* cited by examiner

*Primary Examiner*—Yves Dalencourt
(74) *Attorney, Agent, or Firm*—Abelman, Frayne & Schwab (57) ABSTRACT

A method for creating an initial list of peers in a peer-to-peer (P2P) network comprising initiating a connection from a spy node to a suspect node in the network. A peer list is updated if a transaction between said spy node and said suspect node is successful. If the transaction is not successful; the method is started from the beginning if it is necessary to continue initialization process. On the other hand, if the transaction is not successful and if it is not necessary to continue the initialization process the execution is terminated.

27 Claims, 4 Drawing Sheets

| To From | SPY | KP | KP$_T$ | KI | UU | Information |
|---|---|---|---|---|---|---|
| SPY | - | - | KP$_T$=>KP | KI=>KP | UU=>KP | Destination IP+port |
| KP | - | - | $C_T$+=$\Delta_{KT}$ | $C_T$+=$\Delta_{KI}$ | $C_T$+=$\Delta_{KU}$ | Destination IP+port |
| KP$_T$ | - | - | $C_T$+=$\Delta_{TT}$ | $C_T$+=$\Delta_{TI}$ | - | Destination IP+port |
| KI | - | - | $C_T$+=$\Delta_{IT}$ | $C_T$+=$\Delta_{II}$ | - | Destination IP+port |
| UU | UU=>KI | UU=>KI | - | - | - | Source IP |

INITIALIZATION AND ACQUISITION OF PEERS IN A PEERS' LIST IN A PEER-TO-PEER NETWORK

The present application claims priority from U.S. Provisional Patent Application No. 60/520,648, submitted Nov. 18, 2003.

I. DESCRIPTION

I.A. Field

This disclosure teaches techniques related generally to peer-to-peer networks. Specifically, techniques for initializing and acquiring a list of peers within a peer-to-peer (P2P) network is discussed.

I.B. Background

1. References

The following U.S. patents, applications and papers provide useful background information, for which they are incorporated herein by reference in their entirety.

| | | |
|---|---|---|
| 6,728,232 | April 2004 | Hasty et al. |
| 6,463,471 | October 2002 | Dreke et al. |
| 6,269,099 | July 2001 | Borella et al. |
| 20030152034 | August 2003 | Zhang et al. |
| 20030041141 | October 2003 | Abdelaziz et al. |
| 20030093562 | May 2003 | Padala |
| 20020184357 | December 2002 | Traversat et al. |
| 20020147771 | October 2002 | Traversat et al. |
| 20020188657 | January 2002 | Traversat et al. |
| 20020143918 | July 2001 | Soles et al. |
| 20020042693 | May 2001 | Kampe et al. |

Shirky, C., "What is P2P . . . And What Isn't", 24 Nov. 2000, http://www.openp2p.com/pub/a/p2p/2000/11/24/shirky1-whatisp2p.html 2. Introduction Peer-to-peer (P2P) networks are increasingly being used to handle connectivity between peers. Details about P2P network are discussed to provide some distinguishing features between the classical client-server approach of communication and P2P. Client-server communication provides connection between subscribers and hosts and was well-known prior to P2P.

The P2P network architecture is different from that of the client-server model frequently used. Clay Shirky in "What is P2P . . . And What Isn't" suggests that "P2P is a class of applications that takes advantage of resources—storage, cycles, content, human presence—available at the edges of the Internet. Because accessing these decentralized resources means operating in an environment of unstable connectivity and unpredictable IP addresses, P2P nodes must operate outside the DNS system and have significant or total autonomy from central servers".

There are several examples for networks which are P2P networks and which do not operate as classical clients and servers. Applications such as AIM, FastTrack, FreeNet, Gnutella, ICQ, and Napster are all types of P2P network applications. A significant feature of these applications is their ability to connect resources, many of them which were previously unused, while being able to operate in an uncertain Internet protocol (IP) address environment. Notably, the P2P network may change their IP addresses over time. However, even with the changes in the IP addresses, the network should provide a successful and flawless operation. The P2P network operates equally as well when nodes are off or on line and as they change IP addresses over time.

Permanent IP addresses were determined through the requirement to use a domain name server (DNS). This requirement created a monopoly of sorts on the generation of addresses for resources connected to the Internet. One possible way of avoiding the DNS requirement is to create a proprietary directory of protocol-specific addresses that can update IP addresses in real time. Another option is to use the plain old numeric IP addresses. And yet another option is to provide the nodes scheduled times to contact fixed addresses, providing their current IP address at the time of the connection. Shirky summarizes it well by noting that "P2P is a way of decentralizing not just features, but costs and administration as well". It should be further noted that all nodes may use encryption to hide the IP addresses from possible detection.

The protocols used can be grouped into groups having common characteristics. The FastTrack and Gnutella family of protocols are hybrid models that result in a controlled as well as a decentralized network. Within this hybrid model, certain nodes in the network are elected as 'super-nodes' or 'ultrapeers' and act as a server of sorts.

The super-nodes change dynamically as bandwidth and the network topology changes. A client-node keeps only a small number of connections open and each of those connections is to a super-node. The super-nodes interact among themselves using a decentralized framework. Queries between nodes are initiated in clear text. The nodes connect directly, i.e., point-to-point, for actual file transfer. Such network protocols are extremely resilient to nodes entering and leaving the system, and there is practically no single point of failure. However, the query system does not scale. Further, no security or anonymity provisions are provided. Still further, the queries generate a significantly large load on the network.

Another family of protocols is commonly used in applications such as FreeNet. In this family of protocols, the system uses a decentralized, or otherwise distributed, model where there is no central server and every node has equal importance. Each node acts as a servant, or a 'peer', and operates as both a client and a server as far as the network management is concerned. Every node within the framework tries to maintain some number of connections to other nodes at all times. Typically the nodes maintain between four and eight connections. This set of connected nodes carries the network traffic, which is essentially made up of queries, replies to queries, various control messages that facilitate the discovery of other nodes, and the files transferred over the network using the protocol. All the traffic is highly encrypted (e.g., using public and private keys).

In this case, the nodes in the network normally do not connect with each other directly for the actual file transfer. These networks are extremely resilient to nodes entering and leaving the system. Further, there is no single point of failure, and high levels of security and anonymity of participants and data are possibly provided. However, the query system is relatively slow as they generally use depth-first-search (DFS) instead of breadth-first-search (BFS) techniques. Furthermore, the file transfer traffic uses the network inefficiently as files are copied to each of the nodes they transfer through, which is done in order to preserve anonymity.

On the other hand, the Napster-like protocols are a class of protocols that create a centralized network, where a central server maintains a constantly updated directory. The nodes issue queries to the central directory server to find which of the participating nodes hold the desired files. The queries are transferred over the network in clear text. The nodes connect directly with each other (i.e., point-to-point) for actual file transfer. The search is fast and efficient and the network load is relatively low. However, such protocols have several drawbacks. There does exist a single point of failure. Further, the system scales poorly and it lacks in security and anonymity. Further, as is now well know, these systems have significant legal vulnerability.

The primary usage of Internet bandwidth in P2P networks is file sharing and therefore most of the traffic consists of queries and file transfers. The characteristic of the P2P traffic has several inherent problems from the network operator's perspective. Recent studies suggest that file sharing activity accounts for up to 60% of the traffic on any given service provider's network. This traffic has a symmetric upstream and downstream nature, i.e., the load to a peer and from a peer is roughly equal. However, it is noteworthy that most of the high bandwidth network edges such as asymmetric data subscriber line (ADSL) and cable modems were designed for asymmetric traffic. The rationale behind the asymmetric traffic capability is in the underlying assumption that a typical user will download from another node more data than data uploaded to another node.

However, the P2P traffic that has a more balanced upstream and downstream utilization, over utilizes the upstream bandwidth. Moreover, increasingly a small percentage of the network users abuse the system by consuming a disproportionate share of the bandwidth, thereby affecting the quality of service for the entire population of network subscribers. While a P2P network resides in the physical network, it makes no consideration for cost boundaries. A service provider pays much more for transit lines as opposed to peering points. However, the P2P network may use transit peers as often, resulting in a total higher cost which is not accounted for.

II. BRIEF DESCRIPTION OF THE DRAWINGS

The disclosed teachings will become more apparent by describing in detail, implementations of the techniques discussed herein with reference to the attached drawings in which.

III. SUMMARY

It would be advantageous to propose techniques that are capable of identifying and controlling the network usage of a P2P network. It would be further advantageous if the techniques are based on heuristic algorithms for P2P networks clients' identification, as such a solution would provide a good tradeoff between cost and speed. It would be further advantageous to use encryption. It would be further advantageous if the techniques allow further action by the network administrator based on the peer list generated.

To overcome some of the problems noted above and realize some of the advantages discussed above the disclosed teachings provide a method for creating an initial list of peers in a peer-to-peer (P2P) network comprising initiating a connection from a spy node to a suspect node in the network. A peer list is updated if a transaction between said spy node and said suspect node is successful. If the transaction is not successful; the method is started from the beginning if it is necessary to continue initialization process. On the other hand, if the transaction is not successful and if it is not necessary to continue the initialization process the execution is terminated.

In another specific enhancement, a spy node is added to said P2P network prior to the method steps.

In another specific enhancement, a node of said P2P network is configured to be a spy node.

In another specific enhancement, said transaction is one of: file download, file upload, and query.

In another specific enhancement, at least one classifying heuristic is used to determine that the transaction is not successful.

More specifically, the classifying heuristic is one of: transaction time, minimum transaction time, maximum transaction time, amount of data, minimum amount of data, maximum amount of data, amount of upstream data, amount of downstream data, ration between upstream and downstream data, number of connections, and rate of connections.

More specifically, said classifying heuristics is capable of identifying characteristics of said P2P protocol.

In yet another specific enhancement, said spy node is configured to generate communication in a desired P2P protocol.

More specifically, said P2P protocol is at least one of: AIM, FastTrack, FreeNet, Gnutella, ICQ, and Napster.

In another specific enhancement, said network further comprises a packet classifier.

More specifically, said packet classifier is operable to classify layer seven.

More specifically, said packet classifier is operable to classify encrypted P2P protocols.

More specifically, said classification further comprises classification of: layer two transactions, layer three transactions, layer four transactions, layer five transactions, layer six transactions, packet bundles, flow identification, process flow, transaction time, minimum transaction time, maximum transaction time, amount of data, minimum amount of data, maximum amount of data, amount of upstream data, amount of downstream data, and ration between upstream and downstream data.

More specifically, said packet classifier is further capable of monitoring a network traffic to and from said spy node.

More specifically, said packet classifier is operable to allow for said updating of the peer list.

More specifically, said updating of the peer list comprises classifying a source and destination of a packet and updating said peer list based on said classification.

More specifically, said classification is one of a: spy, known peer, temporary known peer, known IP address, and unknown user.

More specifically, communication from the spy node results in the destination IP address and destination port to be listed in a known peers list if said communication is to one of three nodes: temporary known peer, known IP address, and unknown user.

More specifically, each combination of an IP address and port number is associated with a counter.

More specifically, the value of said counter is increased by a predetermined delta value corresponding to said classification.

More specifically, a first delta value is added to said counter when communication is made from a known participant to a temporary known participant.

More specifically, a second delta value is added to said counter when communication is made from a known participant to a known IP participant.

More specifically, a third delta value is added to said counter when communication is made from a known participant to an unknown user.

More specifically, a fourth delta value is added to said counter when communication is made from a temporary known participant to a temporary known participant.

More specifically, a fifth delta value is added to said counter when communication is made from a temporary known participant to an unknown participant.

More specifically, a sixth delta value is added to said counter when communication is made from a known IP participant to a temporary known participant.

More specifically, a seventh delta value is added to said counter when communication is made from a known IP participant to a known IP participant.

More specifically, if said counter has a value above a minimum value and below a maximum value then a participant is considered to be a member of the P2P network.

More specifically, said minimum value and said maximum value are determined over a predefined period of time.

More specifically, communication from an unknown user results in the source IP address of said unknown user to be listed in a known IP participants list if communication is to one of the spy node and a known participant.

Another aspect of the disclosed teachings is a method for identifying peers to be added to an existing list of peers in a peer-to-peer (P2P) network, the method comprising getting a tuple from a packet classifier if a P2P protocol matches a predetermined P2P protocol. If IP addresses and port numbers in the tuple correspond to peers in said list of peers then the method is continued from the beginning. Otherwise, the list of peers is updated and the method is continued from the beginning if it is necessary to process more tuples. If it is not necessary to process more tuples, the execution is terminated.

Yet another aspect of the disclosed teachings is system for initializing a list of peers in a peer-to-peer (P2P) network. The system comprises a spy node connected to said network. A packet classifier operable to classify a P2P tuple and further operable to add a peer to a list of peers based on the classification is provided.

Yet another aspect of the disclosed teachings is a system for identifying peers to be added to an existing list of peers in a peer-to-peer (P2P) network, the system comprising a packet classifier operable to classify a P2P tuple and further operable to add a peer to a peers' list based on the classification of the tuple. The system further comprised a list of peers of said P2P network containing at least a peer.

IV. DETAILED DESCRIPTION

The disclosed teachings provide techniques for creating an initial list of peer in a peer-to-peer (P2P) network. The disclosed teachings further provide techniques for adding P2P participants after an initial list is established. Furthermore, it is usable for protocols using encryption.

Figure 1:
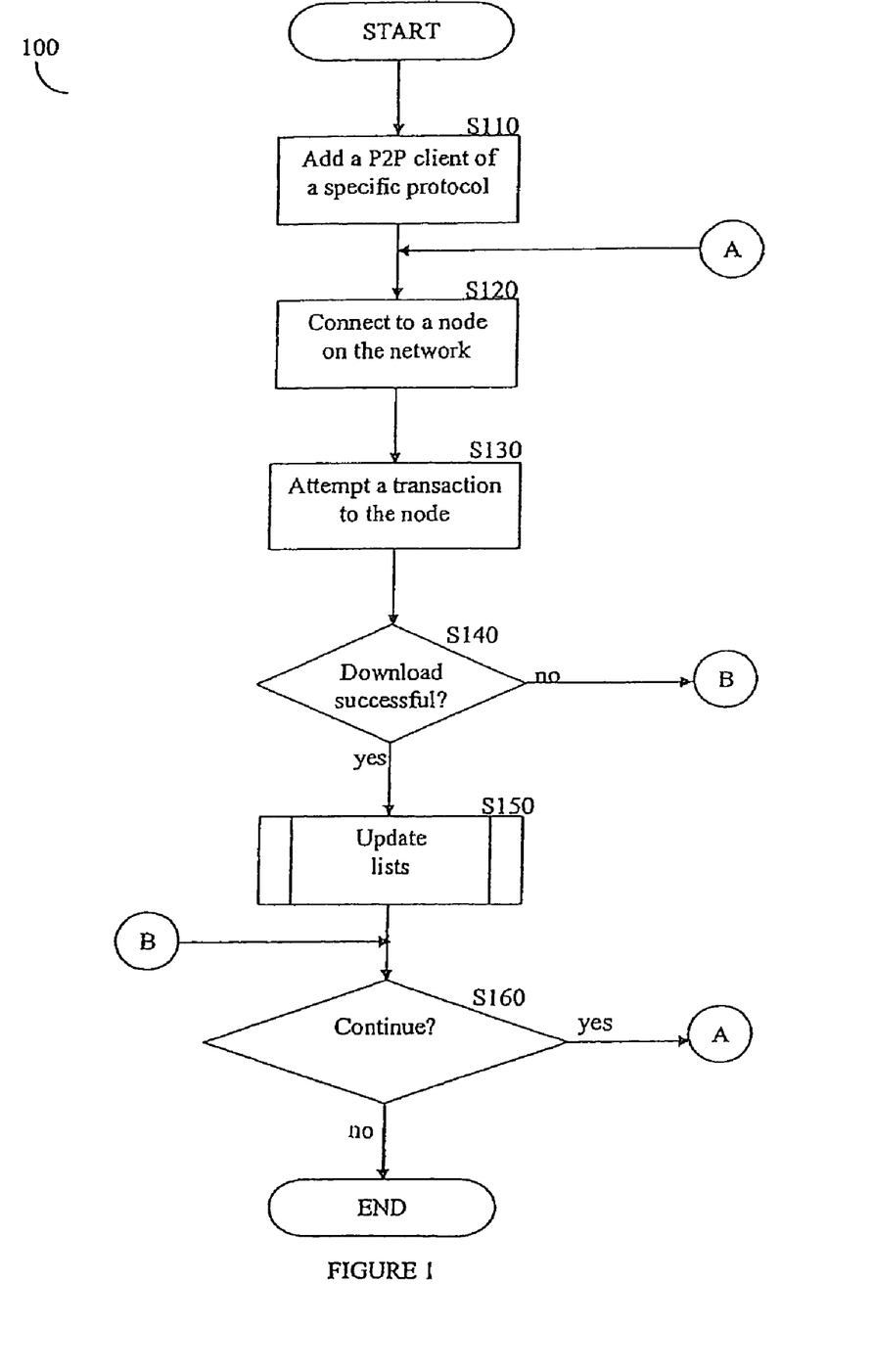
FIG. 1 provides an exemplary flowchart of a method for initializing a peer list embodying aspects of the disclosed teachings.

FIG. 1 provides an exemplary flowchart 100 of a method for initializing a peer list embodying aspects of the disclosed teachings. In step S110, a P2P client of a specific protocol is added to a network. This client is intended to operate as a "spy" aimed at detecting other nodes that participate in the specific network using the selected communication protocol. Alternately, a person skilled-in-the-art would easily be able to configure an existing node of a P2P network to operate as a "spy".

In step S120 a connection is made to a node within the network followed by an attempt, in step S130, to perform a transaction with the node connected to. Such a transaction may include, but is not limited to, file download, file upload, and a query. In step S140 it is checked whether the transaction was successful, and if the transaction is not successful then execution continues with step S160; Otherwise, execution continues with step S150 where the Internet protocol (IP) address and port number are handled as explained in more detail below.

A variety of heuristics may be used to determine if a transaction was successful or not. For example, a very brief transaction exchanging only a limited amount of data may be considered to be not successful, even though the transaction itself did not generate any error. The heuristics used should accommodate the specific characteristics of the P2P protocol being inspected, including, but not limited to, ratio between the upstream and downstream traffic, size of payload transferred, encryption characteristics, and transfer times. It would be therefore preferable to use a packet classifier having classification capabilities including classification capabilities in at least layer seven (the application layer) of the standard communication model.

In step S160 it is checked whether the process should continue, if so, execution continues with step S120. In one embodiment, a predefined threshold of number of peers may be used as a trigger to complete the execution. In another embodiment, execution will continue until the rate of finding new peers goes below a predefined threshold. A person skilled in the art can easily implement a variety of checks to perform the desired function. Otherwise, execution ceases providing an initial list of peers of a given network.

The list may be further referred to as a Known Participants (KP) list. Such a client "spy" can be further configured to operate using another protocol and continue its operation to identify another P2P network within the general network.

Figure 2:
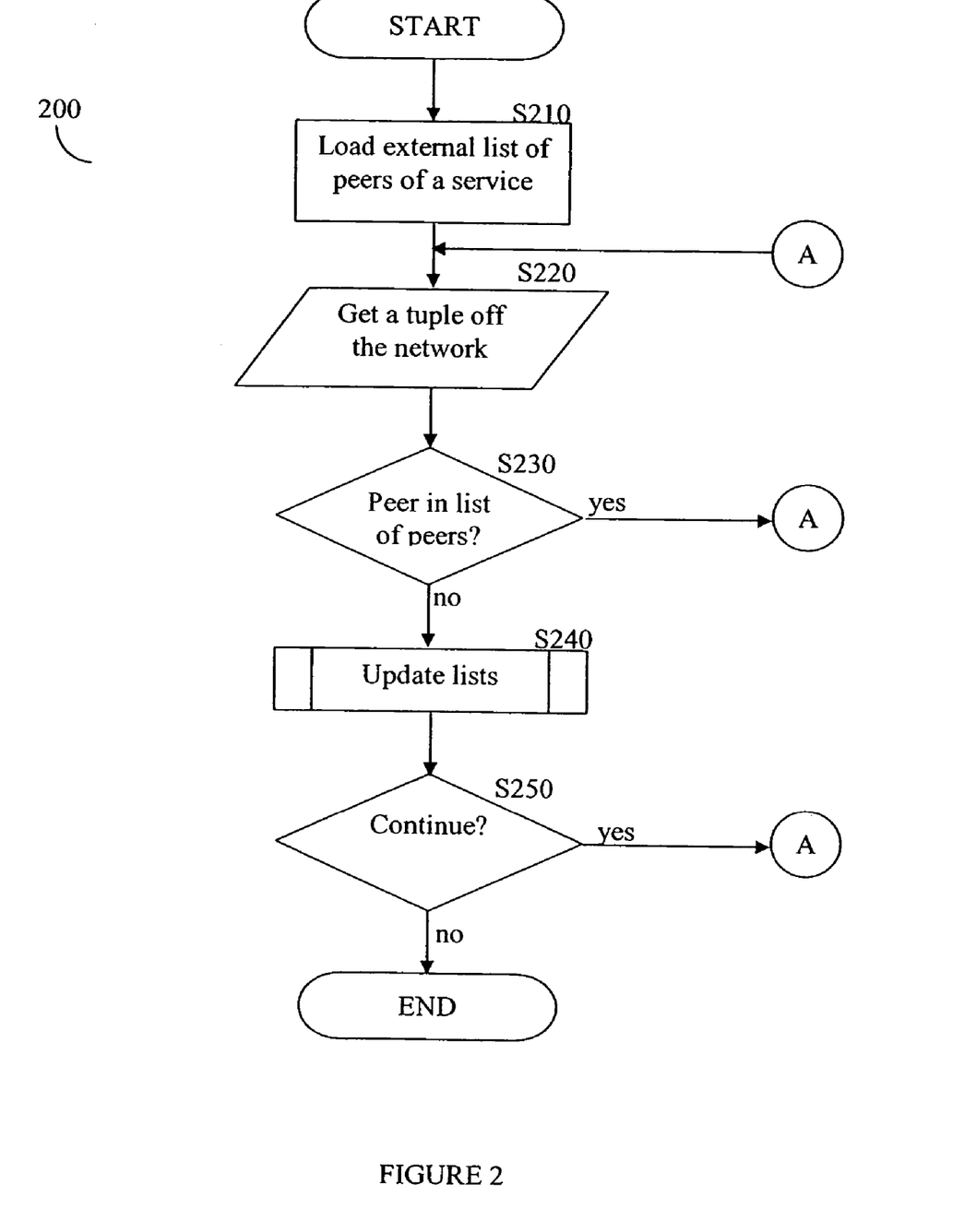
FIG. 2 provides an exemplary flowchart of a method for adding peers of an internal P2P network based on an external peer list.

FIG. 2 shows an exemplary flowchart 200 of a method for adding peers of an internal P2P network based on an external peer list. In step S210, an external list of peers of a service provider is loaded to the system. In another embodiment, the external list is updated periodically. In yet another embodiment, the external list is updated dynamically, i.e., as new data is made available. Such a list may be prepared from publicly available sources and contains at least an IP address and a respective port.

In step S220 a pair of IP address and port are taken off a tuple of a packet traveling over the network. This tuple is used to determine whether the source and destination of the packet are part of a P2P network. Typically a tuple is part of a header of a packet that contains the source IP address, the destination IP address, the protocol used, the source port number, and the destination port number. Preferably, the protocol portion of the tuple should correspond with the type of service that is used by the service provider, however, other classifications may be used to determine if a packet belongs to a P2P network transmission. It is therefore possible to determine whether the two peers are part of a predetermined P2P network.

A variety of heuristics may be used to perform such classification, for example, determination that a packet belongs to a process flow previously identified as an upstream or downstream packet, or a packet having the same flow identification. The heuristics used should accommodate the specific characteristics of the P2P protocol being inspected, including, but not limited to, ratio between the upstream and downstream traffic, size of payload transferred, encryption characteristics, and transfer times. It would, therefore, be preferable to use a packet classifier having classification capabilities, including classification capabilities in at least layer seven (the application layer) of the standard communication model.

In step S230 it is checked whether such IP address and port pair, i.e., the specific user identification, are already part of either the external list or the internal list. The internal list is the list of peers sought and which belong specifically to a service provider, e.g., FreeNet, Napster, and the likes, and if it appears in one of these lists, then execution continues with step S220; otherwise, execution continues with step S240. A person skilled in the art would note that the lists would be prepared per protocol type, and may further contain different or partial information relative to another protocol. In step S240, the IP address and port pair are handled as explained in more detail below. If the pair would have not belonged to the P2P network it would have been identified as part of the external list and hence not handled here. In step S250 it is checked whether the process should continue if so execution continues with step S220; otherwise, execution terminates. In one embodiment a predefined threshold of number of peers may be used as a trigger to complete the execution. In another embodiment execution will continue until the rate of finding new peers goes below a predefined threshold. A person skilled in the art can easily implement a variety of checks to perform the desired function.

Figure 3:
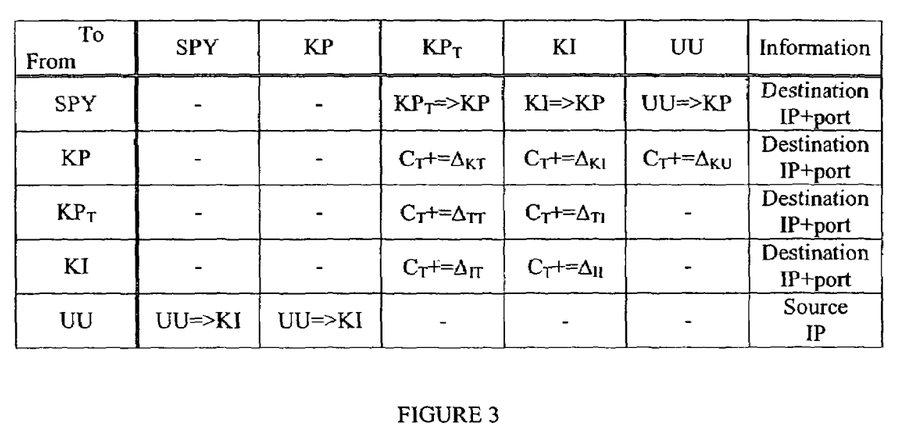
FIG. 3 shows a table describing the actions resulting from detection of a communication between nodes in a P2P network.

Referring to FIG. 3, a table describing the actions, in respect to steps S160 and S240, within a P2P network, is shown. In the first line of the table communication from a "spy" unit is checked. If a "spy" connects successfully, as described above, to a temporary known peer (KPT), then the IP address and port number are stored as part of the known peers (KPs) list. The same will happen if a "spy" connects to either a node where only the IP address is known and it is in the known IP (KI) list, as well as in the case where communication is made successfully to an unknown user (UU). The "spy" is targeted at detecting such peers and if it has both IP address and port number it can be safely assumed that the node is part of the desired P2P network.

In the second line of the table connections from a KP to a potential peer is checked. When a KP communications with node that is on the $KP_T$ list a process must take place. This is required because a single communication is insufficient to establish to make the node on the $KP_T$ list an immediate candidate for a KP list. Therefore the CT counter is used to which a delta value, $\Delta_{KT}$ is added. The value $\Delta_{KT}$ denotes a delta vale for communication between a known peer and a temporary peer. While other such delta variables will be defined later on, this would be the one having the highest value, as it suggests that it is most likely that the KPT node should be moved to the KP list. This would happen once the value of the counter $KP_T$ crosses a predefined minimum threshold value. Similarly a maximum value can be defined as, if there is an extremely high level of communication it could indicate that the node is actually a server rather than a node in a P2P network.

It should be noted that the $C_T$ counter is maintained for each pair of IP address and port. Similarly, the value of the $C_T$ counter is increased by $\Delta_{KI}$ or $\Delta_{KU}$ if the KP node communicates with a KI node or a UU node. A person skilled in the art would place the value of $\Delta_{KI}$ between the values of $\Delta_{KT}$ and $\Delta_{KU}$, giving each case its respective weight, or probability of the node being part of the P2P network.

In the third and fourth line of the table in FIG. 3 communications between a $KP_T$ node and a KI respectively to another node in the network are assessed. The additional delta value provided, $\Delta_{TT}$, $?\Delta_{IT}$, $\Delta_{TI}$, and $\Delta_{II}$, denote delta values based on the likelihood of a communication being between peers of a P2P network. Thus, higher the likelihood the higher such delta value should be. These delta values may vary from network to network as well as being dependent on the nature of the network itself.

In the fifth and last line of the table in FIG. 3 communication of an UU node to the "spy" or to a node in the KP list is shown. This decision is done based on the source IP address provided by the UU node. Such a UU node is reported in the KI list, as at this time only its destination IP address, i.e., the address used to communicate with the UU node when communication is performed from a "spy" or a node in the KP list, is known.

Figure 4:
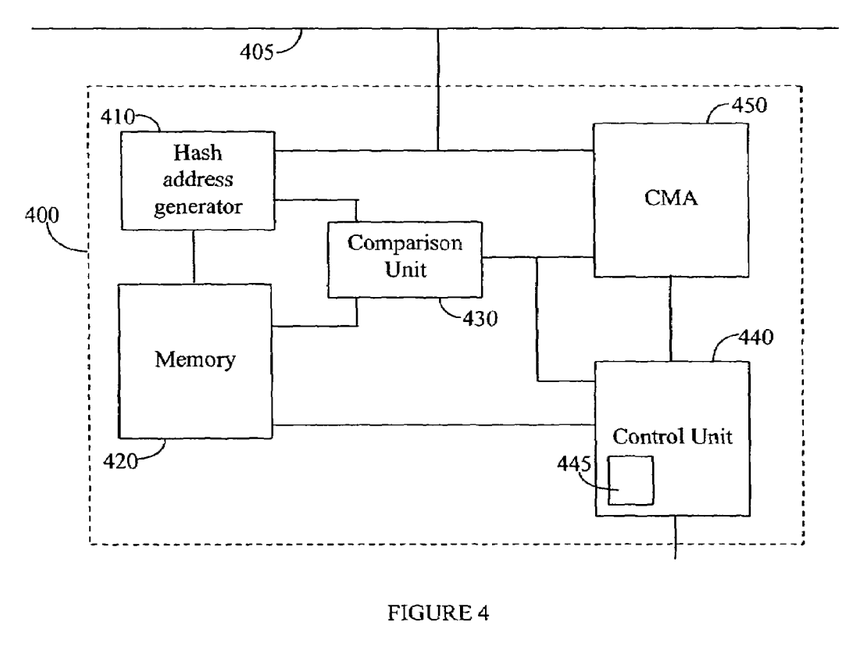
FIG. 4 shows a block diagram of a packet classifier capable of handling a method for initializing a peer list.

Reference is now made to FIG. 4 where an exemplary block diagram of a packet classifier 400 operable to implement some of the techniques disclosed, is shown. A detailed description of a packet classifier is disclosed in U.S. patent application Ser. No. 09/547,034, titled "A Method and Apparatus for Wire-Speed Application Layer Classification of Data Packets", assigned to common assignee and which is hereby included by reference for all it discloses (hereinafter, the "034 application"). For the purpose of this disclosure, the use of the packet classifier 300 is modified to allow for the detection of peers in a P2P network, rather than the classification of process flows disclosed in the 034 application. Following is a brief description of the operation of the packet classifier 400 that is connected to a network 405.

A tuple will typically contain 104 bits that are received by a hash address generator (HAG) 410. The HAG 410 is capable of transforming the 104 bits of the tuple into, for example, a 20 bit long number, allowing for more than a million unique connections to be represented. The operation of HAG 410 is further discussed in detail in the 034 application. The 20 bit hash address generated by HAG 410 is used to access memory 420. Memory 420 is designed in such a way that each hash bucket is capable of storing several separate entries, for example eight entries. Memory 420 is designed so that it has actually several separate entries for each hash address accessing memory 420. Having several entries for each hash address substantially reduces the chance of a tuple being bounced off from the hash table because a particular hash bucket is full.

HAG 410 performs hashing on a tuple associated with a data packet. The result of such a hashing is used to identify a hash bucket that is associated with such tuple. The comparison unit 430 compares data associated with the incoming data packet and the data in each of the eight entries of memory 420. The comparison unit 430 determines that a successful match has resulted if a match is found between the incoming tuple and an entry in the memory. According to an improvement of packet classifier 400, a content addressable memory (CAM) 450 is provided as an additional storage facility to deal with incoming packets having tuples that produce a hash address of a hash bucket that is already full. CAM 450 is accessed with the full tuple corresponding to the incoming packet. Though remote, it is possible that more than several unique tuples would hash into a single hash number. CAM 450 is used for storing information related to such packets having tuples that produce hash addresses that represent hash buckets that are already full. If CAM 450 also gets filled up and an incoming packet cannot be stored in memory 420 or CAM 450, a trap is generated, indicating that the corresponding incoming packet cannot be handled by the data packet classifier.

Operation of packet classifier 400 is done under the control of control unit 440, which can be loaded with instructions that may be stored is control memory 445. Specifically, memory 445 may be loaded with instructions specifically developed for the handling of an apparatus in a service aware network (SAN). An example of such instructions is provided in U.S.

patent application Ser. No. 09/988,831, titled "Apparatus, Method, and Software for Analyzing Network Traffic in a Service Aware Network", assigned to common assignee, and which is hereby included by reference for all it discloses (hereinafter, the "831 application"). The instructions corresponding to the steps disclosed in the methods discussed hereinabove, may be loaded into control memory 445, and result with the required operation. An advantage of the architecture of this packet classifier 400 is its ability to easily scale as system demands grow and require handling of millions of peers belonging to P2P networks in short periods of time and at wire speed. A person skilled in the art could easily adapt the flowcharts disclosed in this disclosure to a series of instructions as described in the 831 application and designed to execute on the system disclosed in the 034 application.

Figure 5:
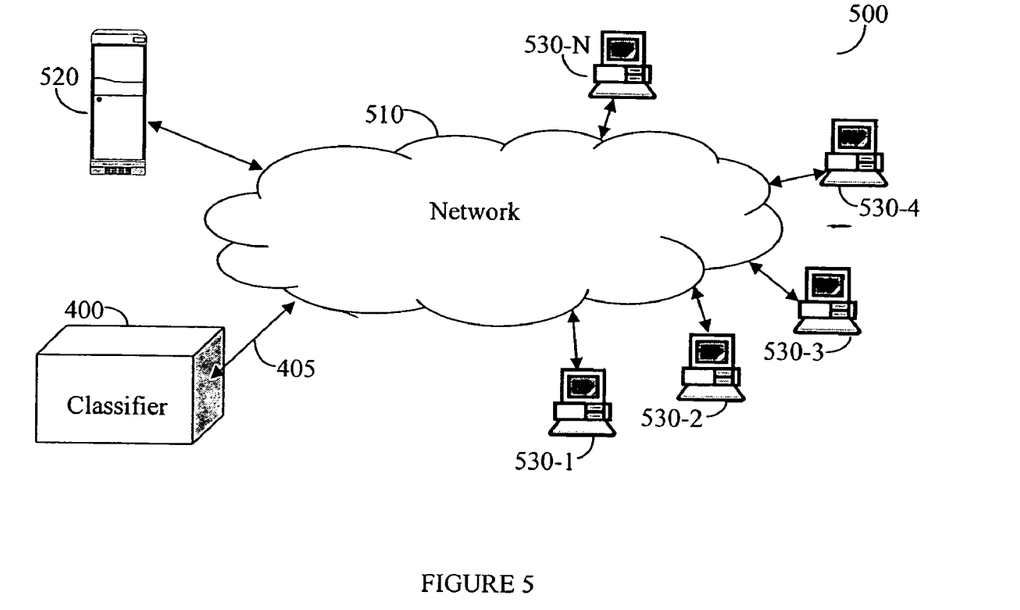
FIG. 5 shows an exemplary network configured in accordance with aspects of the disclosed teachings.

Reference is now made to FIG. 5 where a network 500 configured in accordance with the disclosed teachings is shown. A communication network 510 provides connectivity between various elements of the network. The network is generally connected with a plurality of nodes marked 530-1 through 530-N. Such nodes can be connected first locally using a local area network (LAN) or a wide area network (WAN), or any other type of a network. Such networks may then be connected to larger or even global networks such as the world-wide-web network. Some of the nodes 530-1 through 530-N connected to communication network 510 may be participants of a P2P network, e.g., nodes 530-1, 530-2, 530-4, and 530-N may be part of a FreeNet P2P network, and hence having communication and utilization of the network typical to a P2P network. A service provider wishing to identify such P2P network, for example for the purposes of controlling the bandwidth or charging according to bandwidth actually used, must identify the peers of such P2P network. For that purpose he may add to network 510 a "spy" node 520, operable in accordance with the disclosed teachings. In addition a packet classifier 400 is connected to network 510 through connection 405. Classifier 400 is connected to the network in such a way that it can at least monitor all the packets going upstream and downstream from spy 520. Spy 520 is used in conjunction with classifier 400 during the initialization process being configured to execute the initialization method disclosed above. Once an initial list of peers is established, or if an initial list can be made available through external lists, then it is possible to configure classifier 400 in conjunction with such initial list and the acquisition method disclosed above to add additional participants belonging to the P2P network.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for creating an initial list of peers in a peer-to-peer (P2P) network, the method comprising:
designating a selected P2P protocol;
providing a predetermined function for indicating whether the method should continue or be terminated;
obtaining an external list of potential peers from a service provider of the network;
providing a spy node to detect other nodes that participate in the P2P network using said selected P2P protocol;
designating a node from said external list as a suspect node;
initiating a connection from said spy node to said suspect node;
attempting a transaction from said spy node to said suspect node over said connection;
adding said suspect node to the initial list of peers if and only if said transaction is successful wherein at least one classifying heuristic is used to determine that said transaction is not successful; wherein the classifying heuristic is one of: transaction time, minimum transaction time, maximum transaction time, amount of data, minimum amount of data, maximum amount of data, amount of upstream data, amount of downstream data, ratio between upstream and downstream data, number of connections and rate of connections; and
repeating said designating a node, said initiating a connection, said attempting a transaction and said adding said suspect node if indicated by said predetermined function, and terminating the method otherwise.

2. The method of claim 1, wherein said providing a spy node comprises adding a node to the network.

3. The method of claim 1, wherein said providing a spy node comprises configuring an existing node of the network.

4. The method of claim 1, wherein said transaction is one of: file download, file upload, and query.

5. The method of claim 1, wherein said selected P2P protocol has at least one characteristic, and wherein said classifying heuristic is capable of identifying said at least one characteristic of said selected P2P protocol.

6. The method of claim 1, wherein said selected P2P protocol is at least one of: AIM, FastTrack, FreeNet, Gnutella, ICQ, and Napster.

7. The method of claim 1, further comprising providing a packet classifier.

8. The method of claim 7, wherein said packet classifier is operative to classify layer seven.

9. The method of claim 8, wherein said packet classifier is operative to classify encrypted P2P protocols.

10. The method of claim 8, wherein said classification further comprises classification of: layer two, layer three, layer four, layer five, layer six, packet bundles, flow identification, process flow, transaction time, minimum transaction time, maximum transaction time, amount of data, minimum amount of data, maximum amount of data, amount of upstream data, amount of downstream data, and ratio between upstream and downstream data.

11. The method of claim 7, wherein said packet classifier is further capable of monitoring a network traffic to and from said spy node.

12. The method of claim 11, wherein said packet classifier is operative to allow for said updating of the peer list.

13. The method of claim 12, wherein said updating of the peer list comprises:
classifying a source and destination of a packet; and
updating said peer list based on said classification.

14. The method of claim 13, wherein said classification is one of a: spy, known peer, temporary known peer, known IP address, and unknown user.

15. The method of claim 14, wherein communication from the spy node results in the destination IP address and destination port to be listed in a known peers list if said communication is to one of three nodes: temporary known peer, known IP address, and unknown user.

16. The method of claim 14, wherein each combination of an IP address and port number is associated with a counter.

17. The method of claim 16, wherein the value of said counter is increased by a predetermined delta value corresponding to said classification.

18. The method of claim 17, wherein a first delta value is added to said counter when communication is made from a known participant to a temporary known participant.

19. The method of claim 17, wherein a second delta value is added to said counter when communication is made from a known participant to a known IP participant.

20. The method of claim 17, wherein a third delta value is added to said counter when communication is made from a known participant to an unknown user.

21. The method of claim 17, wherein a fourth delta value is added to said counter when communication is made from a temporary known participant to a temporary known participant.

22. The method of claim 17, wherein a fifth delta value is added to said counter when communication is made from a temporary known participant to an unknown participant.

23. The method of claim 17, wherein a sixth delta value is added to said counter when communication is made from a known IP participant to a temporary known participant.

24. The method of claim 17, wherein a seventh delta value is added to said counter when communication is made from a known IP participant to a known IP participant.

25. The method of claim 17, wherein if said counter has a value above a minimum value and below a maximum value then a participant is considered to be a member of the P2P network.

26. The method of claim 25, wherein said minimum value and said maximum value are determined over a predefined period of time.

27. The method of claim 14, wherein communication from an unknown user results in the source IP address of said unknown user to be listed in a known IP participants list if communication is to one of the spy node and a known participant.

* * * * *

UNITED STATES PATENT AND TRADEMARK OFFICE
CERTIFICATE OF CORRECTION

| | | |
|---|---|---|
| PATENT NO. | : 7,660,889 B2 | Page 1 of 1 |
| APPLICATION NO. | : 10/951727 | |
| DATED | : February 9, 2010 | |
| INVENTOR(S) | : Gotesdyner et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1384 days.

Signed and Sealed this

Twenty-eighth Day of December, 2010

David J. Kappos
*Director of the United States Patent and Trademark Office*